United States Patent

Milligan

[15] 3,657,676
[45] Apr. 18, 1972

[54] TEMPERATURE-COMPENSATED MAGNETIC BEARINGS

[72] Inventor: James W. Milligan, W. Lafayette, Ind.

[73] Assignee: Duncan Electric Company, Inc., Lafayette, Ind.

[22] Filed: Aug. 26, 1970

[21] Appl. No.: 66,917

[52] U.S. Cl............................................335/217, 308/10
[51] Int. Cl..................................................H01f 7/00
[58] Field of Search.................................308/10; 335/217

[56] References Cited

UNITED STATES PATENTS

| 2,560,260 | 7/1951 | Sturtevant et al | 308/10 |
| 3,233,950 | 2/1966 | Baermann | 308/10 |
| 3,143,704 | 8/1964 | Wright | 308/10 X |
| 3,173,067 | 3/1965 | Wright | 335/217 X |
| 3,582,162 | 6/1971 | Baermann | 308/10 |

FOREIGN PATENTS OR APPLICATIONS

| 390,386 | 8/1965 | Switzerland | 335/212 |

*Primary Examiner*—George Harris
*Attorney*—Darbo, Robertson & Vandenburgh

[57] ABSTRACT

In a watthour meter having magnetic suspension of its disk, variations of vertical disk positioning in the gaps of the driving element, with changes in temperature, are reduced or avoided by temperature compensation of the suspension magnets. The suspension magnets use a material of relatively low cost even though it has a relatively high temperature coefficient of remanence.

4 Claims, 1 Drawing Figure

Patented April 18, 1972
3,657,676
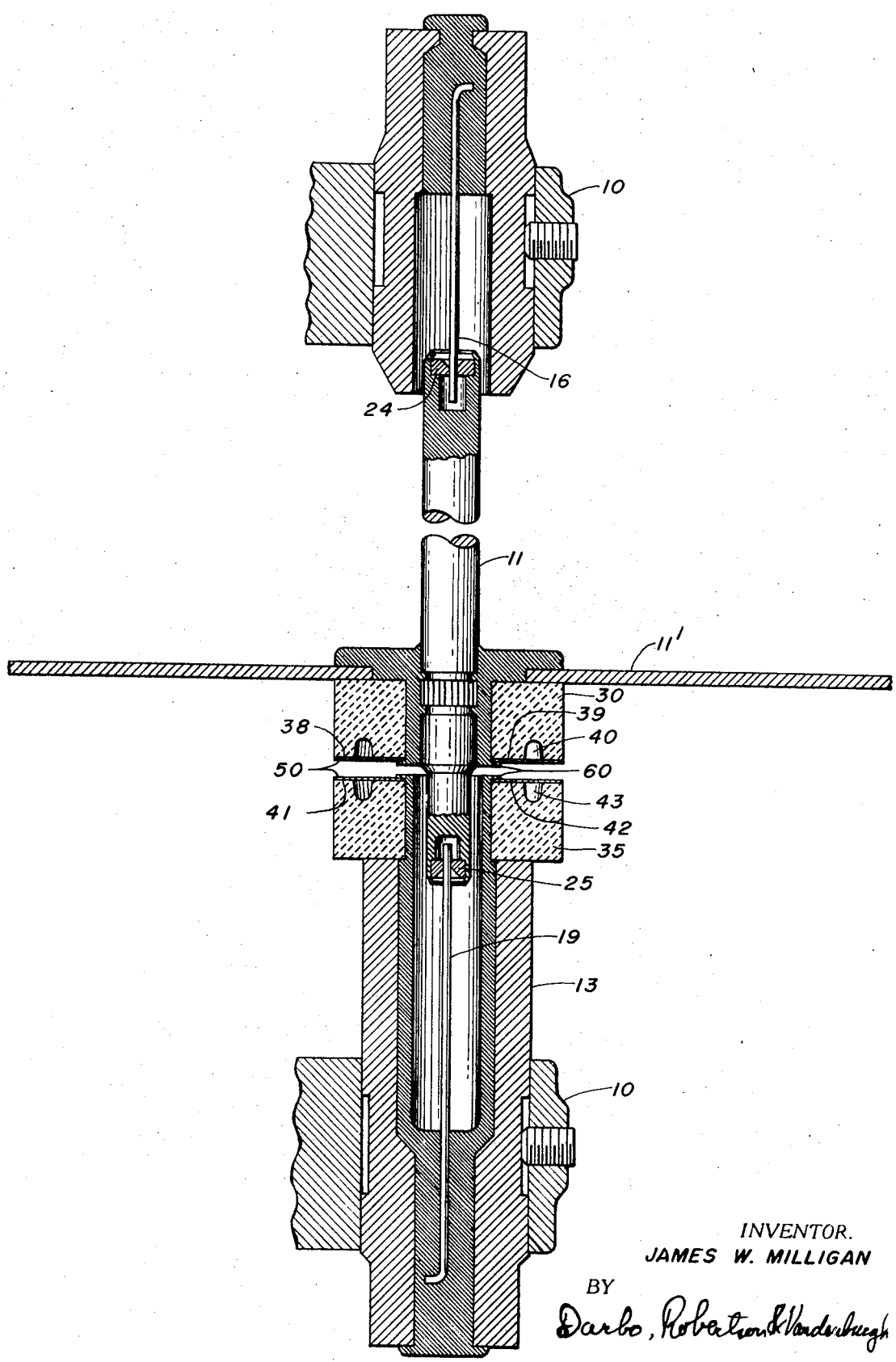
INVENTOR.
JAMES W. MILLIGAN
BY
Darbo, Robertson & Vandenburgh
ATTORNEYS

TEMPERATURE-COMPENSATED MAGNETIC BEARINGS

INTRODUCTION

The magnetic suspension system disclosed in my prior U.S. Pat. No. 3,434,084 issued Mar. 18, 1969, and resulting from an application filed Aug. 14, 1961, has proved exceedingly satisfactory in service. One of the respects in which it has been highly satisfactory has been its temperature stability. Within the temperature ranges to which meters are subjected, there is very little variation in the vertical positioning of the meter disks within the gaps of the driving element. Because the magnetic fields of the gaps are not exactly uniform, variation of disk positioning in the gaps can cause metering inaccuracies.

The good temperature stability was achieved in accordance with the prior disclosure through the use of Alnico as the magnetic material used in the permanent magnets by which the suspension was achieved. The field produced by an Alnico magnet does not change greatly with temperature. In other words, this material has a much lower temperature- coefficient of remanence than is found in some other magnetic materials. This is why Alnico is extensively used for suspension magnets even though considerably more expensive than some of the high-coefficient materials.

According to the present invention, the less expensive materials may be used satisfactorily in spite of having high temperature-coefficients of remanence, by providing temperature compensation of these suspension magnets. A temperature compensation is provided in the preferred form of the invention by a washer on the repelling face of each magnet, bridging across that magnet's two annular poles. Although it might have been assumed that these layers of magnetic material within the suspension gap (that is, lying between the two magnets which are repelling one another by magnetic fields which must penetrate the washers) would interfere unduly with the magnetic suspension, but tests have shown that this is not the case. It is merely necessary to have a little more magnetic material in the magnet, so as to provide the desired field intensity in addition to the flux which is diverted through the washers.

Additional advantages of the invention may be apparent from the following description and from the drawing.

DESIGNATION OF DRAWING FIGURE

The drawing is a vertical cross-sectional view taken mainly along the axis of rotation of the meter disk, with parts broken away to permit the use of an enlarged scale drawing for clarity.

GENERAL DESCRIPTION

Although the foregoing disclosure offered for public dissemination is detailed to ensure adequacy and so aid understanding, this is not intended to prejudice that purpose of a patent which is to cover each new inventive concept therein, no matter how others may later disguise it by variations in form or additions or further improvements. The following claims are intended as the chief aid toward this purpose, as it is these that meet the requirement of pointing out the parts, improvements, or combinations in which the inventive concepts are found.

Referring to the drawing, there is illustrated a portion of an electric watthour meter having a frame represented by boss 10 and a vertical, rotating, shaft generally 11, carrying a disk 11'. The associated elements of the meter such as driving and retarding magnets are well known but are not shown. Their structure and relationship to the illustrated device will be understood by those skilled in the art.

The upper end of the shaft 11 is guided by a pin 16 running in a graphite bearing 24. The weight of the shaft is suspended by magnetic repulsion between magnets 30 and 35, rotor magnet 30 being fast on shaft 11, and stator magnet 35 being fixed in stud or holder 13.

Magnets 30 and 35 are substantially identical. Their four permanent magnet pole faces all face axially, and like poles are directly opposite one another. The outer pole faces 38 and 41 (having the same polarity) are of the same area as the inner pole faces 39 and 42, and the grooves or spaces 40 and 43, each between the two pole faces of one magnet, are quite narrow, in fact narrower in the illustrated form than either pole face. This arrangement, with proper magnetization to support the rotating element with the illustrated gap between magnets 30 and 35 (about 0.05 inch) provides a very stiff suspension, and one in which the magnetic side thrust resulting from minute displacements is very small. During normal operation, pin 19 and graphite ring 25 (having a running fit with pin 19) confine the lateral movement of magnet 30 to such minute lateral displacements that magnetic side thrust is extremely low.

For a more detailed description, except as to changes in accordance with the present invention, reference is made to U.S. Pat. No. 3,434,084, previously mentioned.

LOW COST MAGNETIC MATERIAL

Instead of using Alnico (the material specifically mentioned in U.S. Pat. No. 3,434,084) the present invention makes suitable the use of a lower cost material such as the Barium Ferrite material known commercially as "Indox". Of course, other materials which are known now or may be developed later can also be used, and are made suitable by the present invention if they have relatively high temperature-coefficients of remanence.

TEMPERATURE COMPENSATION OF MAGNETS

According to the present invention, a temperature compensating washer 50 is applied to each of the magnets 30 and 35 across the repelling faces thereof. Thus, on upper magnet 30, the washer 50 extends across the pole faces 38 and 39, and on the lower magnet 35, its washer 50 extends across the pole faces 41 and 42. In each instance, the washers bridge between these pole faces. It is possible that other positions bridging between the pole faces will be found suitable without covering the pole faces.

Each of the washers 50 is made of a material which has a high temperature-coefficient of permeability of same sign or direction as the temperature coefficient of remanence of the magnetic material of magnets 30 and 35. Thus, if a given rise of temperature decreases the amount of flux emanating from magnet 30, the same temperature rise will decrease the amount of flux short circuited by washer 50 between the poles 38 and 39, so that the amount of flux from magnet 30 emanating beneath its washer 50 will remain substantially constant.

Such temperature compensating materials are well known and are available commercially. They are disclosed, for example, in a manual entitled "Carpenter Alloys for Electronic Magnetic and Electrical Applications" available from Carpenter Steel Company of Reading, Pennsylvania. A Carpenter "30" type 5 compensating material has been used with good compensation. However, Types 2, 3 and 4 are also known to be available in the same compensator "30" class of material, and the choice between them and such others as may be available, and the choice of thickness, is probably best made by testing with the particular magnets 30 and 35 and total supported weight which are to be used. The same type could be used for both of the compensating washers 50, or different types could be used if this is found to give greater temperature stability for the assembly. Also they may have the same thickness or different thicknesses. A thickness of about 0.004 inch is at present contemplated. Carpenter Type 1 is also suitable.

MOUNTING OF TEMPERATURE COMPENSATORS

It is still preferred, as described in U.S. Pat. No. 3,434,084, that the magnets 30 and 35 be secured to the respective parts with which they are associated by die casting. The washers 50 may be secured in their proper positions in the same manner, as by being clamped to the respective magnets 30 and 35 during this die casting, with the die shaped to permit the molten metal to extend partly around an edge of each washer 50. Thus in FIG. 1, the dies were shaped to form beads 60 extending through and partially over the face of each of the washers 50. Of course, both the washers 50 and the beads partially over their faces reduce the possible axial movement of the rotary element which can be tolerated during operation. However, a spacing of 0.010 inch is believed to be sufficient between the beads 60. The Barium Ferrite class of materials have an extremely high coercive force so that change in the magnetic state of these materials, except temporary changes with temperature changes, is not to be expected. The washers 50 should be chosen of a thickness and a material which will fully compensate for the temperature changes, so that axial movement of the rotary element during service will be substantially zero. Of course, during shipment there may be jars which will cause some axial movement and bring the beads 60 into contact with one another. However, this is not objectionable and indeed may be relied upon to provide the same protection heretofore provided by the axial clearance beyond the tip of guide pin 19. This clearance beyond the tip of guide pin 19 can be made greater, and become relatively noncritical, if the spacing between beads 60 is such as to serve the same purpose suitable. However, retaining the accustomed clearance above the tip of pin 19 and making beads 60 thin enough not to contact one another, is preferred.

It may be found to be entirely suitable, and may be preferred by some manufacturers, to cement the washers 50 to the magnets 30 and 35, instead of or in addition to securing them by beads 60. They can be cemented under pressure so that the cement will not be objectionable magnetically or dimensionally. An epoxy cement can be used for adequate permanence.

MAGNETIZATION

The magnets 30 and 35 can be magnetized, before application of the temperature compensator washers to them, by face magnetization as described in U.S. Pat. No. 3,434,084, especially as illustrated in FIG. 6. It is believed also practicable to magnetize them after die casting, at least if the washers 50 are cemented to the magnets, or if beads 60 are shaped to permit the magnetizing fixture to have its inner pole face of the same dimensions as the inner poles 39 and 41 of the magnets. To this end, the washers 50 could extend inwardly slightly beyond the cylindrical inner faces of magnets 30 and 35, or they could be tapered on their inner edges so that the covering beads would not need to extend axially beyond the exposed faces of the washers 50.

ACHIEVEMENT

From the foregoing it is seen that magnetic suspensions with highly satisfactory temperature stability can be provided using the inexpensive magnetic materials which have a temperature-coefficient of remanence too high to be satisfactory without the compensation of this invention. Some of these materials are of such high coercive force that providing a shielding washer at the faces of the magnets opposite the repelling faces (as has been done with other material) is not deemed necessary. The invention can also be used to provide more perfect temperature stability utilizing materials which would be deemed acceptable even without such temperature compensation. Although the temperature stability using Alnico VII has been outstandingly acceptable by present standards, if there should be a demand for even greater temperature stability the present invention could meet that demand, using Alnico VII.

I Claim:

1. A magnetic suspension for a rotating element for which vertical temperature stability is important, including a pair of magnets having annular pole faces facing one another axially with like polarity for suspension of the rotating element by magnetic repulsion, the said pole faces of each magnet including inner and outer magnetically opposite poles, said magnets having a temperature-coefficient of remanence of substantial value, and a temperature compensating washer applied to at least one of said magnets across its two said pole faces, and substantially in contact therewith, to divert flux from extending into the useful gap between the magnets, said compensating washer having a temperature-coefficient of permeability of a direction to compensate for the magnet's temperature-coefficient of remanence so as to cause useful flux in the gap between the magnets to be more uniform with variations in temperature than if the washer were not present.

2. The invention of claim 1 in which at least one magnet bearing a washer has a groove between the pole faces, and defining them, and lying behind the washer from the other magnet.

3. The invention of claim 1 in which the magnets have sufficient uniformity axially about the rotational axis to substantially avoid any magnet-induced drift in the intended use.

4. A magnetic suspension for a rotating element for which vertical temperature stability is important, including a pair of magnets having annular pole faces facing one another axially with like polarity for suspension of the rotating part by magnetic repulsion, the said pole faces of each magnet including inner and outer magnetically opposite poles, said magnets having a temperature-coefficient of remanence of substantial value, and a temperature compensating washer of a thickness of the order of 0.004 inch, amounting to a small fraction of the gap distance between the magnets, applied to at least one of said magnets across its two said pole faces, and substantially in contact therewith, and having a temperature-coefficient of permeability of a direction to compensate for the magnet's temperature-coefficient of remanence so as to cause useful flux in the gap between the magnets to be more uniform with variations in temperature than if the compensating washer were not present.

* * * * *